(12) United States Patent
Komiya

(10) Patent No.: US 7,622,900 B2
(45) Date of Patent: Nov. 24, 2009

(54) SEMICONDUCTOR INTEGRATED CIRCUIT SUPPLYING VOLTAGE TO A LOAD USING A CHARGE PUMP AND ELECTRONIC DEVICE INCLUDING THE SAME

(75) Inventor: Kunihiro Komiya, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 170 days.

(21) Appl. No.: 11/780,724

(22) Filed: Jul. 20, 2007

(65) Prior Publication Data

US 2008/0024097 A1    Jan. 31, 2008

(30) Foreign Application Priority Data

Jul. 27, 2006    (JP)    ............... 2006-204578

(51) Int. Cl.
*G05F 1/563* (2006.01)
*H02M 3/18* (2006.01)

(52) U.S. Cl. ........................ 323/266; 363/59

(58) Field of Classification Search ............ 363/59, 363/60; 327/536, 266, 268
See application file for complete search history.

(56) References Cited

U.S. PATENT DOCUMENTS

| 6,392,904 B1 * | 5/2002 | Bayer et al. ............... 363/59 |
| 6,989,999 B2 * | 1/2006 | Muramatsu et al. ........... 363/60 |
| 7,271,642 B2 * | 9/2007 | Chen et al. ............... 327/514 |

FOREIGN PATENT DOCUMENTS

| JP | 2002-204569 | 7/2002 |
| JP | 2005-33865 | 2/2005 |
| JP | 2005-176513 | 6/2005 |

* cited by examiner

*Primary Examiner*—Gary L Laxton
(74) *Attorney, Agent, or Firm*—Fish & Richardson P.C.

(57) ABSTRACT

A semiconductor integrated circuit includes a charge pump boosting an input voltage and outputting the boosted voltage to a load, and a charge pump control circuit outputting a voltage to the charge pump based on the output voltage of the charge pump and determining an upper limit value of a current to be output to the charge pump based on the output voltage of the charge pump.

4 Claims, 2 Drawing Sheets

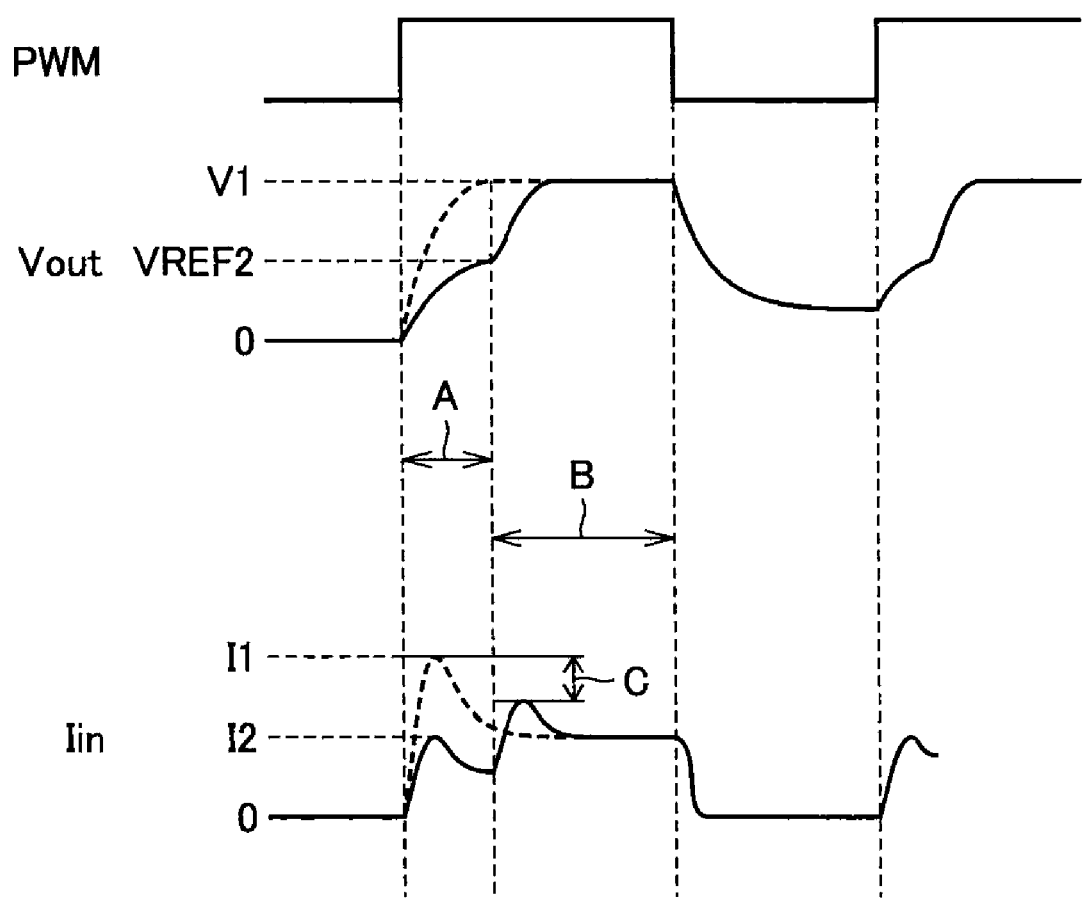

SEMICONDUCTOR INTEGRATED CIRCUIT SUPPLYING VOLTAGE TO A LOAD USING A CHARGE PUMP AND ELECTRONIC DEVICE INCLUDING THE SAME

BACKGROUND OF THE INVENTION

1. Field of the Invention

The present invention relates to a semiconductor integrated circuit and an electronic device including the same. Specifically, the present invention relates to a semiconductor integrated circuit supplying a voltage to a load using a charge pump, as well as to an electronic device including the circuit.

2. Description of the Background Art

In a semiconductor integrated circuit using a charge pump, generally, a regulator is provided for changing an input voltage to the charge pump based on an output voltage of the charge pump, to keep the output voltage of the charge pump at a prescribed voltage.

In a conventional semiconductor integrated circuit using a charge pump, when a current supply to a load starts immediately after power-on of the semiconductor integrated circuit, a large current flows to the load instantaneously, causing malfunction of the circuit.

In order to solve such a problem, Japanese Patent Laying-Open No. 2005-33865 (Patent Document 1), for example, discloses a semiconductor integrated circuit in which a current flowing to an output terminal of a charge pump is detected by a sense resistor and a current detecting circuit, and a current limiting circuit is provided so that an input current of about twice the output current is kept flowing at an input terminal of the charge pump circuit, whereby the current is made constant, peak current is suppressed to prevent noise generation, and malfunction of other circuits connected to the same input power supply as the charge pump is prevented.

In the semiconductor integrated circuit described in Patent Document 1, however, as the sense resistor is arranged between the charge pump and the output terminal, the output voltage of semiconductor integrated circuit lowers in accordance with the output current. Therefore, it is necessary to increase the output voltage of the charge pump by the amount of voltage lowered by the sense resistor, which leads to undesirable increase of power consumption of the semiconductor integrated circuit. When a dynamic load is connected to an output of the semiconductor integrated circuit, namely, when a current flowing through the load varies, the output voltage of the semiconductor integrated circuit fluctuates, as the sense resistor is arranged between the charge pump and the output terminal.

SUMMARY OF THE INVENTION

An object of the present invention is to provide a semiconductor integrated circuit allowing reduction of power consumption and stabilization of output, as well as to provide an electronic device including such a circuit.

According to an aspect, the present invention provides a semiconductor integrated circuit, including: a charge pump boosting an input voltage and outputting the boosted voltage to a load; and a charge pump control circuit outputting a voltage to the charge pump based on the output voltage of the charge pump, and determining an upper limit value of a current to be output to the charge pump based on the output voltage of the charge pump.

Preferably, the charge pump control circuit includes a comparator comparing the output voltage of the charge pump with a prescribed voltage and outputting a signal representing a result of comparison, and a regulator determining an upper limit value of a current to be output to the charge pump based on the signal received from the comparator; and the comparator has hysteresis characteristic.

Preferably, the load is an LED.

According to another aspect, the present invention provides an electronic device, including a semiconductor integrated circuit, wherein the semiconductor integrated circuit includes a charge pump boosting an input voltage and outputting the boosted voltage to a load, and a charge pump control circuit outputting a voltage to the charge pump based on the output voltage of the charge pump, and determining an upper limit value of a current to be output to the charge pump based on the output voltage of the charge pump.

The present invention reduces power consumption and stabilizes output.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram showing voltage waveforms in an electronic device 201 when an LED 21 is driven by PWM method.

DESCRIPTION OF THE PREFERRED EMBODIMENTS

Figure 1:
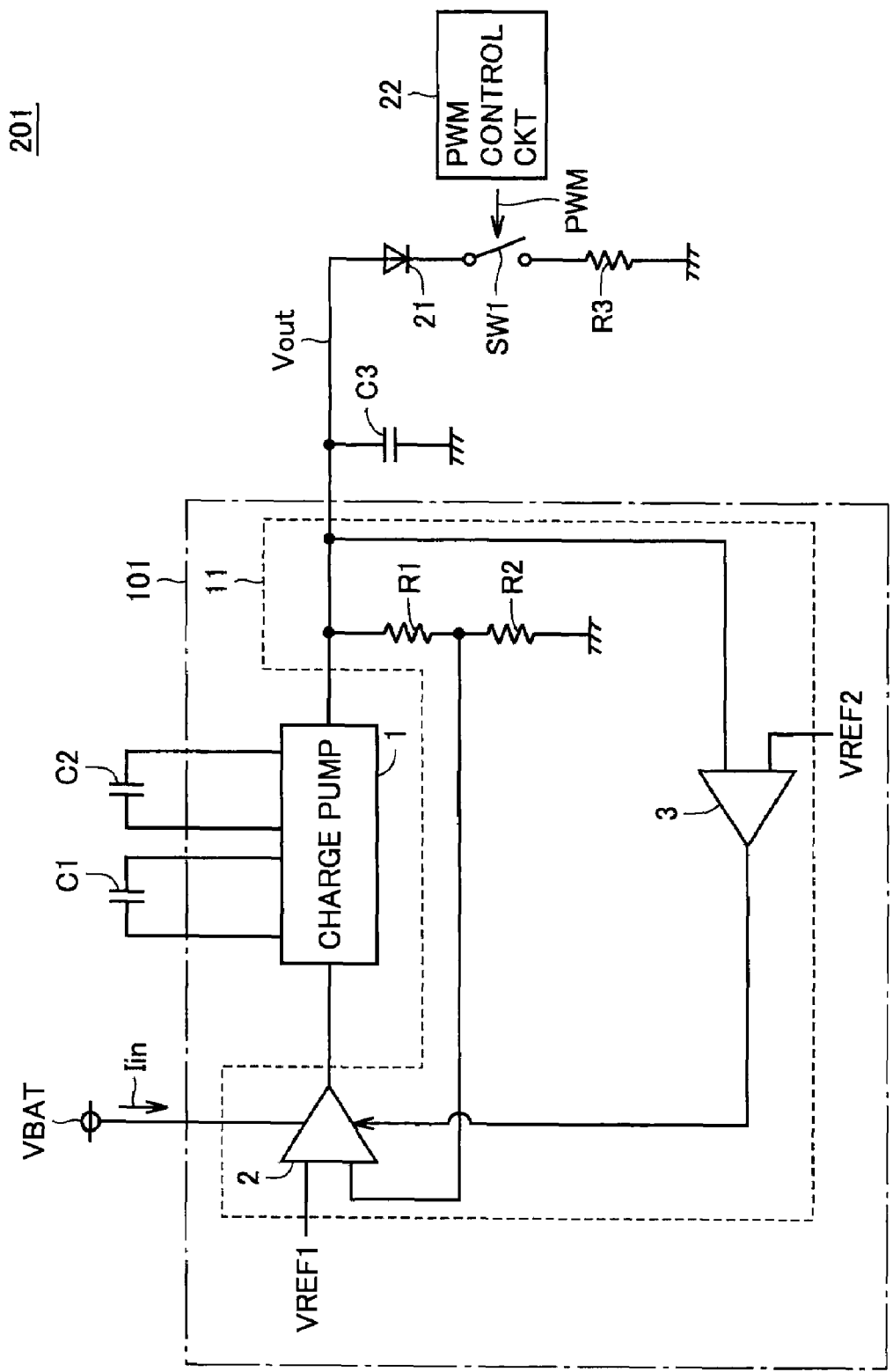
FIG. 1 shows a configuration of an electronic device in accordance with an embodiment of the present invention.

In the following, an embodiment of the present invention will be described with reference to the figures. In the figures, the same or corresponding portions will be denoted by the same reference characters and description thereof will not be repeated.

[Configuration and Basic Operation]

FIG. 1 shows a configuration of the electronic device in accordance with an embodiment of the present invention. Referring to FIG. 1, an electronic device 201 includes a semiconductor integrated circuit 101, capacitors C1 to C3, an LED (Light Emitting Diode) 21, a resistor R3, a PWM (Pulse Width Modulation) control circuit 22, and a switch SW1. Semiconductor integrated circuit 101 includes a charge pump 1 and a charge pump control circuit 11. Charge pump control circuit 11 includes a regulator 2, a comparator 3 and resistors R1 and R2.

Charge pump 1 boosts an input voltage, and outputs the boosted voltage to LED 21 as a load. Capacitor C3 smoothes the output voltage of charge pump 1.

Charge pump control circuit 11 outputs a voltage to charge pump 1 based on the output voltage of charge pump 1, so as to maintain the output voltage of charge pump 1 at a prescribed voltage. More specifically, regulator 2 compares the output voltage of charge pump 1 with a prescribed voltage VREF1, and determines the voltage to be output to charge pump 1 so that these two voltages become equal to each other. The output voltage of charge pump 1 is detected by resistors R1 and R2.

Charge pump control circuit 11 determines an upper limit value of current output to charge pump 1 based on the output voltage of charge pump 1. Specifically, comparator 3 compares the output voltage of charge pump 1 with a prescribed voltage VREF2, and outputs a signal of H-level or L-level, based on the result of comparison. By way of example, comparator 3 outputs a signal of L-level when the output voltage of charge pump 1 is lower than the prescribed voltage VREF2, and outputs a signal of H-level when the output voltage of charge pump 1 is not lower than the prescribed voltage VREF2.

Regulator 2 determines the upper limit value of the current to be output to charge pump 1, based on the signal received from comparator 3. By way of example, regulator 2 sets a prescribed upper limit value of the current to be output to charge pump 1 upon receiving the L-level signal from charge pump 1, and cancels setting of the upper limit value upon receiving the H-level signal.

Regulator 2 may have a configuration that sets a first upper limit value on the current to be output to charge pump 1 upon receiving the L-level signal from charge pump 1 and sets a second upper limit value higher than the first upper limit value, upon receiving the H-level signal.

Switch SW1 switches whether the voltage from charge pump 1 is to be supplied to LED 21 or not, based on a PWM signal received from PWM control circuit 22.

PWM control circuit 1 controls switch SW1 and supplies the voltage from charge pump 1 periodically to LED 21 using PWM method, and thereby adjusts luminance of LED 21.

FIG. 2 shows voltage waveforms in electronic device 201 when LED 21 is driven in accordance with PWM method. Here, PWM denotes the PWM signal output by PWM control circuit 22, VOUT denotes the output voltage of charge pump 1, and Iin denotes a current flowing from a power supply potential VBAT to regulator 2. Further, dotted lines represent voltage waveforms observed in a conventional electronic device in which the current is not limited, and solid lines represent voltage waveforms observed in electronic device 101 in which the current is limited.

Referring to FIG. 2, when the PWM signal makes a transition from the L-level to the H-level, voltage VOUT increases gradually. Here, if the current is not limited, current Iin abruptly increases to the current value I1 as represented by the dotted line.

On the other hand, in electronic device 101, comparator 3 outputs an L-level signal in period A immediately after the transition of PWM signal from the L-level to the H-level, as the output voltage of charge pump 1 is lower than the prescribed voltage VREF2. Receiving the L-level signal from charge pump 1, regulator 2 sets the upper limit of current to be output to charge pump 1 at a current value I2. By such an arrangement, it becomes possible to prevent abrupt increase of current Iin at the rise of PWM signal by the amount of current represented by C, for example, and malfunction of electronic device 101 can be prevented.

In a period B in which the output voltage of charge pump 1 attains to VREF2 or higher, comparator 3 outputs a H-level signal. Receiving the H-level signal from charge pump 1, regulator 2 cancels the limit of current to be output to charge pump 1. Then, the output voltage of charge pump 1 reaches the target voltage value V1.

In the semiconductor integrated circuit described in Patent Document 1, the current flowing through the output terminal of charge pump is detected by the sense resistor and the current detecting circuit. Specifically, the sense resistor is arranged between the charge pump and the output terminal, and hence, it is necessary to increase the output voltage of the charge pump by the amount of voltage lowered at the sense resistor, resulting in a problem that the power consumption of the semiconductor integrated circuit increases. Further, when a dynamic load is connected to an output of the semiconductor integrated circuit, a problem arises that the output voltage of the semiconductor integrated circuit varies as the sense resistor is arranged between the charge pump and the output terminal. The semiconductor integrated circuit in accordance with the embodiment of the present invention, however, is structured not to detect the output current of the charge pump, and charge pump control circuit 11 determines the upper limit of current to be output to charge pump 1 based on the output voltage of charge pump 1. Specifically, the semiconductor integrated circuit in accordance with the embodiment of the present invention has a structure in which the sense resistor is not arranged between the charge pump and the output terminal. Therefore, it is unnecessary to increase the output voltage of the charge pump by the amount of voltage lowered at the sense resistor. Further, even when a dynamic load is connected to the output of the semiconductor integrated circuit, fluctuation of the output voltage of the semiconductor integrated circuit can be prevented. Therefore, in the semiconductor integrated circuit in accordance with the embodiment of the present invention, power consumption can be reduced and the output can be stabilized.

Comparator 3 may have a structure having hysteresis characteristic. Specifically, comparator 3 has the prescribed voltage VREF2 as the first threshold value, and has a prescribed voltage VREF3 smaller than the prescribed voltage VREF2 as the second threshold value. Comparator 3 uses the first threshold value as the threshold value for changing the output signal from the L-level to the H-level, and uses the second threshold value as the threshold value for changing the output signal from the H-level to the L level.

By such a structure, even when a dynamic load is connected to the output of semiconductor integrated circuit 101 or when the output voltage of charge pump 1 fluctuates because of noise or the like, it is possible to prevent regulator 2 from setting and canceling limitation of the output current repeatedly in a short period of time, and hence, it becomes possible to realize stable output.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor integrated circuit, comprising:
   a charge pump arranged to boost an input voltage and to provide the boosted voltage to a load; and
   a charge pump control circuit arranged to provide a voltage to the charge pump based on an output voltage of the charge pump, and to determine an upper limit value of a current to be provided to the charge pump based on the output voltage of the charge pump, wherein said charge pump control circuit includes:
      a comparator arranged to compare the output voltage of said charge pump with a prescribed voltage and to provide a signal representing a result of said comparison, and
      a regulator arranged to determine an upper limit value of a current to be provided to said charge pump based on the signal received from said comparator; and
   wherein said comparator has a hysteresis characteristic.

2. The semiconductor integrated circuit according to claim 1, wherein said load is an LED.

3. An electronic device comprising a semiconductor integrated circuit, wherein said semiconductor integrated circuit includes:
   a charge pump arranged to boost an input voltage and to provide said boosted voltage to a load, and a charge pump control circuit arranged to provide a voltage to said charge pump based on an output voltage of said charge pump, and to determine an upper limit value of a current to be provided to said charge pump based on the output voltage of said charge pump, wherein said charge pump control circuit includes:
- a comparator arranged to compare the output voltage of the charge pump with a prescribed voltage and to provide a signal representing a result of the comparison, and
- a regulator arranged to determine an upper limit value of a current to be provided to the charge pump based on the signal received from the comparator; and wherein the comparator has a hysteresis characteristic.

4. The electronic device according to claim 3 including an LED as the load.

* * * * *